Sept. 3, 1946.  E. A. STALKER  2,406,917
WING
Filed Jan. 2, 1940  2 Sheets-Sheet 1
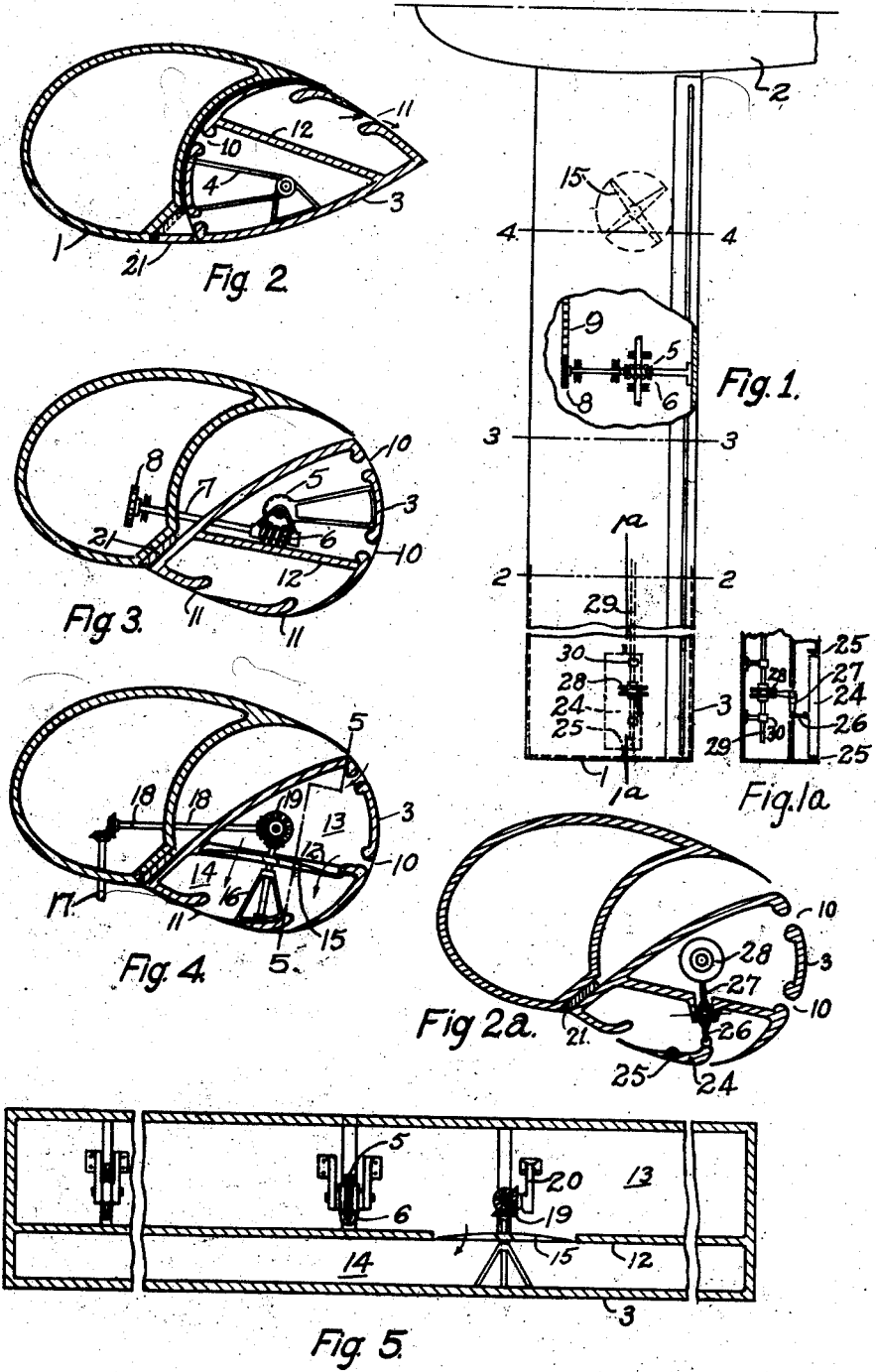
INVENTOR.
Edward A. Stalker Sept. 3, 1946.  E. A. STALKER  2,406,917
WING
Filed Jan. 2, 1940  2 Sheets-Sheet 2

INVENTOR
Edward A. Stalker

Patented Sept. 3, 1946

2,406,917

UNITED STATES PATENT OFFICE 2,406,917

WING

Edward A. Stalker, Ann Arbor, Mich.

Application January 2, 1940, Serial No. 312,175

6 Claims. (Cl. 244—42)

My invention relates to means of controlling the boundary layer on wings and has for its object first, to provide a means of obtaining high lifting capacity; second, to provide a means of converting a tapered wing section to a blunt ended one while preserving a large chordwise expanse; third, to provide a means of varying the mean camber line of the wing while converting it to one of blunt end; other objects will appear from the description and drawings.

This application contains material of the same character as application Serial No. 262,801 filed March 18, 1939.

This application discloses a different means to convert the wing to a blunt one and also has a different slot arrangement.

I obtain these objects by the means illustrated in the accompanying drawings in which:

Figure 1 is a fragmentary plan view of the aircraft when the flap is in its downward rotated position;

Figure 1a is a fragmentary section along the line 1a—1a in Figure 1;

Figure 2 is a cross-section at the station 2—2 in Figure 1, with the flap extended rearward;

Figure 2a is a section along the line 2a—2a in Figure 1;

Figure 3 is a cross-section along the line 3—3 in Figure 1;

Figure 4 is a cross-section along the line 4—4 in Figure 1;

Figure 5 is a section along line 5—5 in Figure 4;

Figure 7:
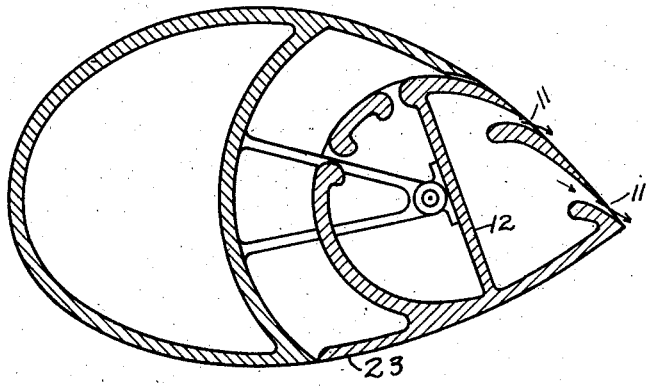
Figure 7 is a section along line 7—7 in Figure 6.

In converting a wing with sharp trailing edge to one having a blunt end it is desirable to make the conversion by rotating a flap, since this presents a simple mechanical arrangement. In general this form of conversion results in too great a reduction in the chord of the wing so that its area is reduced. I have invented a type of wing and flap wherein the chord length is maintained at a high value and the mean camber of the wing is increased. It requires less energy to control the boundary layer on a highly cambered surface and hence it is desirable to move the rear end of the wing so that the camber is increased simultaneously with the conversion to a blunt end. This is accomplished by off-setting the axis of rotation of the flap.

Referring more particularly to the drawings, 1 is the wing of the preferred form and 2 is the fuselage in Figure 1. As shown in this figure and Figures 3 and 4, the flap 3 has been rotated so that the trailing end points toward the nose of the section. Figure 2 shows the flap pointing rearward as for high-speed flight.

The flap is supported on the forward portion by the brackets 4, Figure 2, stationed along the span. It is rotated by the toothed sector 5 attached to the flap wall as shown in Figure 3. Mating with the sector is the worm 6 fixed to the shaft 7 which is turned by the sprocket 8 which is activated from the fuselage by the chain 9.

The flap contains the induction slots 10 and the discharge slots 11. A partition 12 divides the flap interior into two compartments 13 and 14. It has an opening in which is positioned the blower 15 to induct air at the induction slots and blow it out the discharge slots. The blower is supported rotatably in the bracket 16 and is driven from the shafts 17 and 18. The latter gear meshes with the idler bevel gear 19. The gear on the blower meshes with the idler which is supported by bracket 20. It will now be clear that the flap can be rotated about the axis of gear 19 while power is applied to the blower from the shaft 18 through the idler gear 19.

The flap has proper chordwise slots to accommodate the bracket 4 which is attached to the front portion of the wing, and the shaft 18.

A sealing flap 21 (Figure 2) is used to seal the gap between the flap and the front portion of the wing. Since the mechanism to operate such flaps is well-known it is not further described.

By placing the center of rotation closer to the lower surface than the top of the flap the flap is made to move so that the chord is altered to only a small degree. Then the area of the wing retains a high value. Also the wing with the blunt end takes upon itself a cambered form which is conducive to high lift attainments.

A lower surface slot directing the flow forward and acting alone will have a negligible effect on shifting the front stagnation point rearward because the trailing edge imposes a rigidity on the location of the rear stagnation point fixing it for large angles of attack of the wing at a point on the upper surface near the trailing edge. However, if the flap is rotated downward a large amount it becomes possible for the lower surface slot to accomplish what had previously been ruled out. A large shift rearward of the front stagnation point is made and can even reach the locality of the trailing edge. Then the effect of the lower surface slot will be to double the lift. The lower slot alone would increase the lift by possibly 10 per cent for the same power expenditure of the blower.

The flap is a necessary feature and gives with the lower surface slot a shift of the front stagnation point wholly out of proportion to what would be attained by simply adding the effects. The maximum shift occurs when the flap has been rotated to give the wing a blunt rear end with a broad rearward facing surface but intervening positions give very large shifts also.

Figure 8:
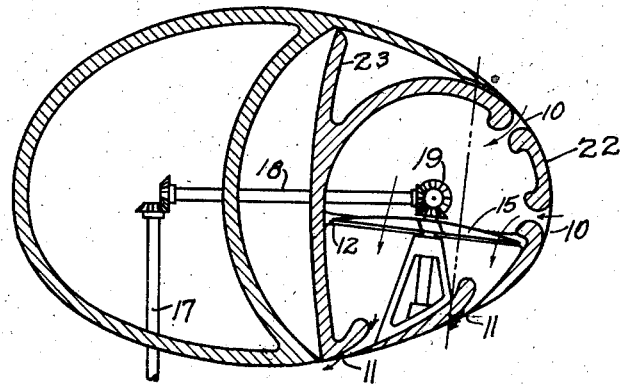
Figure 8 is a section at the station 8—8 in Figure 6 with the flap trailing edge pointing rearward.
Figure 6:
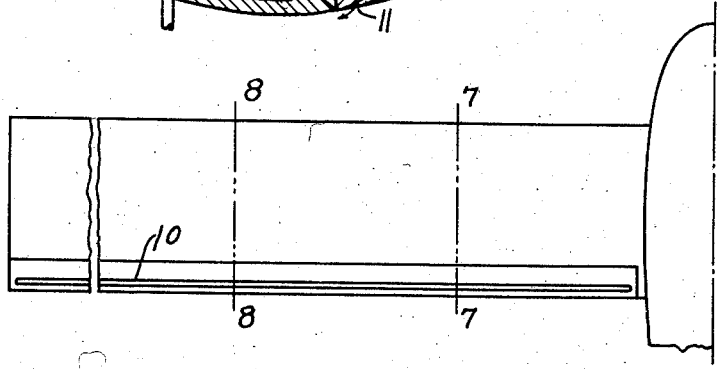
Figure 6 is a fragmentary plan view of an alternate form of the invention.
Figure 9:
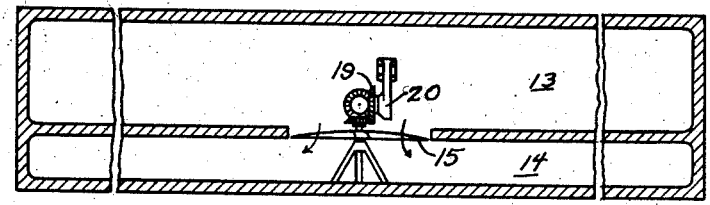
Figure 9 is a section along line 9—9 in Figure 8.

Another form of the invention is shown in Figures 7 to 9. It is suited to very thick wings, and does not require a flap 21. The means of rotating it and driving its blower is the same as in Figures 1 and 4.

The flap 22 carries the lip 23 which seals the gap between the flap proper and the forward part of the wing as illustrated in Figures 7 and 8.

In the rearward directed position the blowing slots direct their discharge rearward and aid in propelling the aircraft.

In this application I use the term wing to apply to the lifting surfaces on one side of the plane of symmetry of the aircraft. The span of the wing is the lateral extent of this surface.

In order to control the boundary layer the wing must have such a form that a layer tends to form rather than a region of relatively large depth filled with large scale eddies. For instance, if the wing has square edges at the nose instead of the usual streamline nose the flow will leave the wing surface and the region between the wing and the main flow will be filled with eddying air. Boundary layer control is then not applicable.

It is also desirable that the wing section have no reverse curvature on the suction surfaces, or abrupt projections which amount to the same thing.

One of the features of this invention is the large radius of curvature of the wing section contour in the vicinity of the juncture of main wing body and the flap as well as for the whole rear end. Preferably the flap is composed of spanwise extensive segments forming the slots between them and each having such a curvature that the rear end contour is smooth. It is possible however to achieve good results with segments which individually have curvatures not conforming to the envelope curve of the rear contour. Although not as good as the type which conforms to the envelope they will however give results. Successively rearward segments should make successively greater angles with the main wing body. The average radius of curvature should be large—that is comparable to the maximum semi-thickness of the wing.

The wing should have at least the conventional aspect ratio because a boundary layer controlled wing produces a very high lift and as is well-known the lift is accompanied by an induced drag which is inversely proportional to the aspect ratio, speaking in terms of the lift and drag coefficients. Preferably the aspect ratio considering both right and left wings in toto should be greater than 6.

The action at the suction slot induces a high velocity flow rearward from the nose of the wing. This is favorable. It tends however to retard the flow on the trailing edge side of the suction slot and if the suction is high it can actually reverse the flow on this portion of the wing, causing a local burbling which decreases the lift. By placing a discharge slot aft of the suction slot the flow is made to proceed rearward in spite of the suction.

To control the airplane a portion of the flap 3 is made movable. This is the vane 24 which is hinged at 25. See Figure 1a. It is rotated about the axes of 25 by the rod 26 suitably articulated to it and to the bell crank 27. The latter is actuated by the grooved block 28 fixed to the rod 29 slidable spanwise in the guides 30. This rod extends to the control in the fuselage. It will be readily appreciated that sliding the rod in the guides will rotate the bell crank and the vane 24.

The vane can be rotated so as to close the slots at its ends for any position of the flap. Stopping the flow through the slots will alter the lift for any attitude of the flap.

While I have illustrated specific forms of the invention it is to be understood that I do not limit myself to these precise forms but intend to claim it broadly as indicated by the claims.

I claim:

1. A wing structure comprising a wing fore body having an upper and a lower airfoil surface and an inwardly curved recessed end portion, a lift increasing device having a curved surface of a radius comparable with the semi-thickness of said end of the fore body and having an end tapering to a relatively thin edge, means for mounting said device at the rear of said fore body providing for adjustment in the relative position thereof, means for adjusting said device from a high speed position in which said curved surface is received within said recessed end and said thin edge is extended rearwardly to a high lift position in which said curved surface is exposed at the rear of said wing forming a smooth continuous curve extending from the upper wing surface around the end and to the lower wing surface, said thin edge being moved against said fore body in said high lift position, means forming a slot on the upper exposed surface of said device in the high speed position thereof, and means within said wing for discharging a flow of air through said slot in a generally rearward direction in the high speed position of said device, said slot in the high lift position of said device being located on the lower side of said wing and acting to direct a flow of air outwardly thereof and with a forward component of velocity for causing closer approach of the front and rear stagnation points.

2. A wing structure comprising a wing fore body having an upper and a lower airfoil surface and an inwardly curved recessed end portion, a lift increasing device having a thin edge at one end and a curved surface of a radius comparable with the semi-thickness of said end of the forebody and adapted to be received within said recessed portion, means for mounting said device at the rear of said fore body providing for adjustment in the relative position thereof, means for adjusting said device from a high speed position in which said curved surface is received within said recessed end and said thin edge is extended rearwardly to a high lift position in which said curved surface is exposed at the rear of said wing forming a smooth continuous curve extending from the upper wing surface around the end and to the lower wing surface, said thin edge being moved into closed relation with said fore body in said high lift position, means forming a plurality of slots on the exposed surface of said device in the high lift position thereof, means within said wing for inducing an inward flow through an upper one of said slots and for directing an outward flow through a lower one of said slots with a forward component of velocity for causing closer approach of the front and rear stagnation points in the high lift position of said device, said lower slot in the high speed position of said device being located on the upper side of the wing and acting to direct a flow of air outwardly thereof in a rearward direction.

3. A wing structure comprising a wing fore body having an upper and a lower airfoil surface and an inwardly curved recessed end portion, a lift increasing device having a curved surface of a radius comparable with the semi-thickness of said end of the fore body and having an end tapering to a relatively thin edge, means for mounting said device at the rear of said fore body providing for adjustment in the relative position thereof, means for adjusting said device from a high speed position in which said curved surface is received within said recessed end and said thin edge is extended rearwardly to a high lift position in which said curved surface is exposed at the rear of said wing forming a smooth continuous curve extending from the upper wing surface around the end and to the lower wing surface, said thin edge being moved against said fore body in said high lift position, means forming a slot on the upper exposed surface of said device in the high speed position thereof, and means within said wing for discharging a flow of air through said slot in a generally rearward direction in the high speed position of said device, said slot in the high lift position of said device being located on the lower side of said wing and acting to direct a flow of air outwardly thereof and with a forward component of velocity for causing closer approach of the front and rear stagnation points, the walls of said slot being formed to direct said outward flow of air in a substantially tangential direction along the surface of said device.

4. A wing structure comprising a wing fore body having an upper and a lower airfoil surface and an inwardly curved recessed end portion, a lift increasing device having a curved surface of a radius comparable with the semi-thickness of said end of the fore body and having an end tapering to a relatively thin edge, means for mounting said device at the rear of said fore body providing for adjustment in the relative position thereof, means for adjusting said device from a high speed position in which said curved surface is received within said recessed end and said thin edge is extended rearwardly to a high lift position in which said curved surface is exposed at the rear of said wing forming a smooth continuous curve extending from the upper wing surface around the end and to the lower wing surface, said thin edge being moved against said fore body in said high lift position, means forming a slot on the upper exposed surface of said device in the high speed position thereof, means within said wing for discharging a flow of air through said slot in a generally rearward direction in the high speed position of said device, said slot in the high lift position of said device being located on the lower side of said wing and acting to direct a flow of air outwardly thereof and with a forward component of velocity for causing closer approach of the front and rear stagnation points, and adjustable control means for varying the opening through said slot to alter the lift characteristics thereof by control of the discharge of air therethrough.

5. A wing structure comprising a wing fore body having an upper and a lower airfoil surface and an inwardly curved recessed end portion, a lift increasing device having a curved surface of a radius comparable with the maximum semi-thickness of said fore body and having an end tapering to a relatively thin edge, means for pivotally mounting said device for rotation about an axis which is closer to the bottom contour of the wing than to the top, means for adjusting said device from a high speed position in which said curved surface is received within said recessed end and said thin edge is extended rearwardly to a high lift position in which said curved surface is exposed at the rear of said wing forming a smooth continuous curve extending from the upper wing surface around the end and to the lower wing surface, said thin edge being moved against said fore body in said high lift position, means forming a slot on the upper exposed surface of said device in the high speed position thereof, and means within said wing for discharging a flow of air through said slot in a generally rearward direction in the high speed position of said device, said slot in the high lift position of said device being located on the lower side of said wing and acting to direct a flow of air outwardly thereof and with a forward component of velocity for causing closer approach of the front and rear stagnation points.

6. A wing structure comprising a wing fore body having an upper and a lower airfoil surface and an inwardly curved recessed end portion, a lift increasing device having a curved surface of a radius comparable with the semi-thickness of said end of the fore body and having an end tapering to a relatively thin edge, means for mounting said device at the rear of said fore body providing for adjustment in the relative position thereof, means for adjusting said device from a high speed position in which said curved surface is received within said recessed end and said thin edge is extended rearwardly to a high lift position in which said curved surface is exposed at the rear of said wing forming a smooth continuous curve extending from the upper wing surface around the end and to the lower wing surface, said thin edge being moved against said fore body in said high lift position, means forming a slot on the upper exposed surface of said device in the high speed position thereof, means within said device for discharging a flow of air through said slot in a generally rearward direction in the high speed position of said device, said slot in the high lift position of said device being located on the lower side of said wing and acting to direct a flow of air outwardly thereof and with a forward component of velocity for causing closer approach of the front and rear stagnation points, and means operable from within the wing for operating said discharge means in both the high lift and high speed positions of said device.

EDWARD A. STALKER.